W. F. RUWELL.
SUCTION VALVE.
APPLICATION FILED FEB. 11, 1914.

1,120,546.

Patented Dec. 8, 1914.

Witnesses—
Charles H. York.
William T. Hase.

Inventor—
William F. Ruwell.
by his Attorneys
Howson & Howson

THE NORRIS PETERS CO., PHOTO-LITHO., WASHINGTON, D. C.

UNITED STATES PATENT OFFICE.

WILLIAM F. RUWELL, OF PHILADELPHIA, PENNSYLVANIA.

SUCTION-VALVE.

1,120,546. Specification of Letters Patent. Patented Dec. 8, 1914.

Application filed February 11, 1914. Serial No. 818,107.

*To all whom it may concern:*

Be it known that I, WILLIAM F. RUWELL, a citizen of the United States, residing in Philadelphia, Pennsylvania, have invented certain Improvements in Suction-Valves, of which the following is a specification.

My invention consists of an improved form of suction valve of the type used in gas compressor pumps for refrigerating machines, and one object of said invention is to provide a valve of simple construction which may be easily and quickly adjusted to suit different pressures of gases.

Another object is to prevent certain of the parts from falling into the compressor chamber, if they should happen to break.

Figure 1:
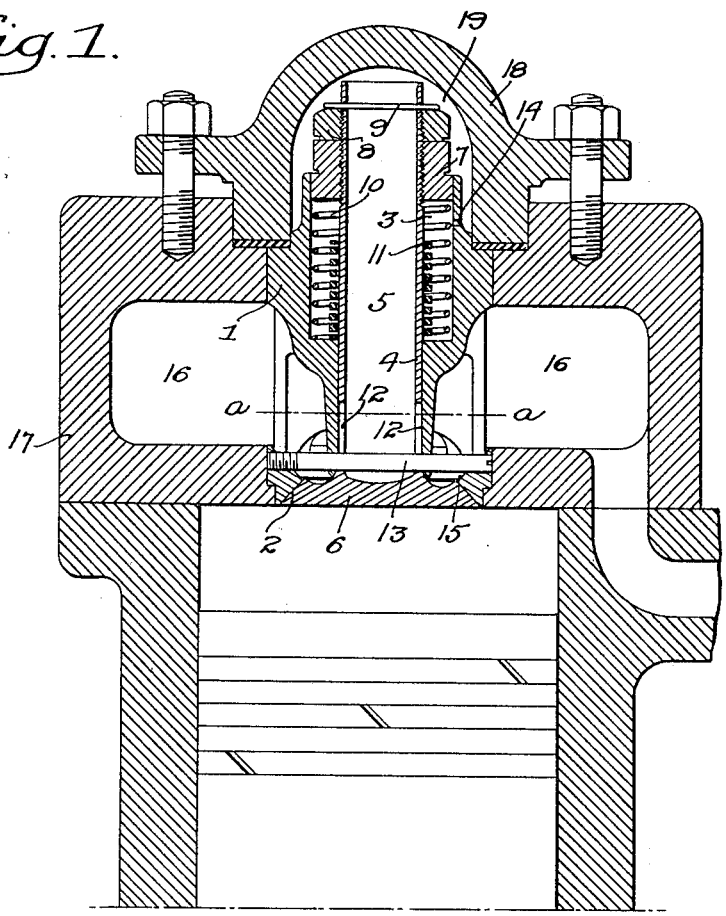
Figure 2:
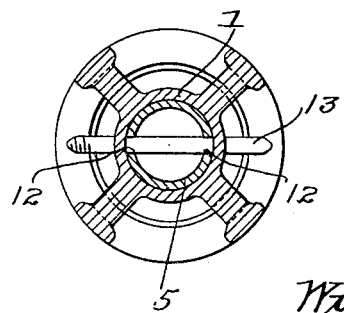

These objects and other advantages which will be described hereinafter I attain in the following manner; reference being had to the accompanying drawing in which, Figure 1 is a view in sectional elevation of sufficient of a compressor to illustrate my invention; and Fig. 2 is a transverse sectional view taken on the line a—a Fig. 1.

Referring to the drawings, 1 is the main valve casing having a valve seat 2, a spring or cushion chamber 3 and an opening 4 in which slides the valve stem 5 of the valve 6. The upper end of the valve stem 5 is threaded and has secured thereon a piston nut 7 and a lock nut 8; a pin 9 being detachably secured to the upper end of said stem for a purpose hereinafter described. I preferably mount a main spring 10 and an auxiliary spring 11, within the spring chamber 3, and of these the main spring 10 extends the entire length of said chamber engaging both the piston nut 7 and the bottom of the chamber, while the auxiliary spring 11 rests within the chamber 3 with its upper end normally free of the piston nut 7 as shown in Fig. 1.

The valve stem 5 is preferably made hollow and is provided with two diametrically opposed slots 12 through which passes a threaded rod 13 which is secured within the lower portion of the casing 1. The valve casing is secured in a compressor structure 17 by means of a bonnet 18 which is bolted to the head of said structure so as to provide a compartment or chamber 19 which incloses the upper part of the valve casing and communicates with the interior of the hollow valve stem 5. The casing 1 is provided with a port 14, which, when the valve is closed, as shown in Fig. 1, is located between the inner surface of the piston nut 7 and the extreme inner end of the chamber 3 so as to communicate with the bonnet chamber 19.

Under operating conditions the valve 6 is opened by suction in the compressor chamber, and gas is drawn through the opening 15 in the casing. The valve continues to freely open until the piston nut 7 closes the port 14, at which time the air or gas within the chamber 3 will be compressed and form a cushion, thereby retarding and finally stopping the opening movement of the valve. After the proper amount of gas has been admitted into the compression chamber, the spring 10 and the cushioned gas in the chamber 3 act against the piston nut 7 to quickly move the valve into its closed position. The auxiliary spring 11 serves as an abutting means for the piston nut 7 if the spring 10 should happen to break or if the suction in the compression chamber should be too great. The threaded rod 13 acts as an additional safety means since it serves as a positive stop to prevent the valve stem from being lowered beyond the limit prescribed by the length of the slots 12. This latter feature is also of particular advantage in case the valve stem should break, because it will prevent the upper portion of the valve stem from dropping into the compression chamber and possibly causing considerable damage. The pin 9 also acts as a check to prevent the locking nut from working off the valve stem.

In a valve constructed in accordance with my invention, the gas is freely sucked into the compression chamber and the valve thereafter closes promptly; thus preventing any of the compressed gas from returning therethrough. Also, the noise caused by the opening and closing of valves which are in common use will be practically eliminated.

By cushioning the gas within the chamber 3 after the valve has moved to its proper opening position the strain is practically taken away from the spring 11, since the cushioned or inclosed gas is compressed by the piston nut 7 after the latter passes the port 14. As a consequence the spring 10 will last for a long time, where the springs, heretofore used in valves of this type frequently broke and required replacing.

The lower or sleeve portion of the valve casing normally forms a closure for the slots 12 in the valve stem 5 as shown in Fig. 1. However, after the valve 6 has been moved downwardly to a certain extent by the suction in the suction chamber of the compressor structure, these slots will be uncovered and communicate with said suction chamber thereby creating a suction through the hollow valve stem, compartment 19, port 14, and cushion chamber 3. This effects a quick opening of the valve 6 because the piston 7 is quckly moved by said suction within the cushion chamber until it reaches and cuts off the port 14; the imprisoned gas then acting as a cushion to retard the movement of said piston.

The piston nut 7 renders it very easy to replace or clean the chamber 3, since it is only necessary to withdraw the pin 9 in order to remove it with the nut 8. Also by having the piston nut 7 mounted on the threaded portion of the valve stem it can be quickly and accurately adjusted with relation to the port 14. This is also an advantageous feature of my invention since by it the valve may be easily regulated to operate with gas of any pressure.

By having the threaded rod 13 inserted as shown in Fig. 1 it cannot come out as it is so positioned that its ends abut the portion of the compressor in which the valve casing is seated.

I claim:—

1. The combination of a structure having a suction chamber; a valve casing having a cushion chamber; a suction valve having a stem extending through the chamber; a piston on said stem fitting the chamber; a structure providing a compartment around the valve casing, said casing having a port leading from the cushion chamber and positioned to be closed by said piston during the opening of the valve; and a conduit connecting the suction chamber and the port after the valve is first moved.

2. The combination of a main casing having a suction chamber; a valve casing provided with a cushion chamber and a port leading therefrom; a valve mounted in the valve casing; a piston in said cushion chamber; and a conduit placed to connect the port and the suction chamber after the valve has been moved off its seat.

3. The combination of a main casing having two chambers with a passage therebetween; a valve casing having a cushion chamber and a port leading therefrom; a valve for closing said passage; a piston in said cushion chamber and movable with the valve; and a conduit placed to connect between said first chambers and the port when the valve is moved to open said passage.

4. The combination of a main casing having two chambers with a passage therebetween; a valve casing having a cushion chamber with a port leading therefrom; a structure forming a compartment into which said port opens; a hollow stem for said valve opening into said compartment and having a slotted portion normally closed by the valve casing; a piston on said stem operable in the cushion chamber, said valve being movable to bring the slotted portion of the stem into communication with the main casing chambers.

5. The combination of a main casing having two chambers with a passage therebetween; a valve casing having a cushion chamber with a port leading therefrom; a structure forming a compartment into which said port opens; a hollow stem on said valve opening into said compartment and having slots normally closed by said valve casing; a piston on said stem operable in the cushion chamber, said valve being movable to bring the slotted portion of the stem into communication with the main casing chambers; with a rod detachably secured to the casing and extending through the slots in the stem.

6. The combination of a main casing having two chambers with a passage therebetween; a valve casing; a valve therein normally closing said passage; a bonnet forming a compartment into which said valve casing extends; a tubular valve stem having its free end opening into said bonnet chamber and having a slotted opening normally closed by the valve casing; said casing having a cushion chamber and a port connecting the same with the bonnet chamber; and a piston on the valve stem operable in the cushion chamber, said valve being operable to bring the slotted opening of the valve stem into communication with the main casing chambers.

7. The combination of a main casing having a chamber with a passage leading therefrom; a valve casing within said chamber and having a ring fitting within the passage; a valve movable in said valve casing and having a slotted stem; and a retaining rod in said valve casing extending through the slot of the stem and having its ends abutting the wall of said passage.

8. The combination of a main casing having a chamber with a passage leading therefrom; a valve casing within said chamber including a portion fitting within the passage and having a threaded opening; a valve movable in said valve casing and having a slotted stem; and a threaded retaining rod fitting the threaded opening of the valve casing and extending through the slot of the stem with its ends immediately adjacent the walls of said passage to lock it in place.

In testimony whereof, I have signed my name to this specification, in the presence of two subscribing witnesses.

WILLIAM F. RUWELL.

Witnesses:
AUGUSTUS B. COPPES,
JOS. H. KLEIN.